United States Patent
Plüss

(10) Patent No.: US 8,916,798 B2
(45) Date of Patent: Dec. 23, 2014

(54) LASER MACHINING APPARATUS WITH SWITCHABLE LASER SYSTEM AND LASER MACHINING METHOD

(75) Inventor: Christoph Plüss, Burgdorf (CH)

(73) Assignee: Ewag AG, Etziken (CH)

( * ) Notice: Subject to any disclaimer, the term of this patent is extended or adjusted under 35 U.S.C. 154(b) by 353 days.

(21) Appl. No.: 13/372,546

(22) Filed: Feb. 14, 2012

(65) Prior Publication Data
US 2012/0205356 A1 Aug. 16, 2012

(30) Foreign Application Priority Data
Feb. 16, 2011 (DE) .................. 10 2011 000 768

(51) Int. Cl.
*B23K 26/36* (2014.01)
*B23K 26/42* (2006.01)
*B23K 26/06* (2014.01)
*B23P 25/00* (2006.01)
*B23K 26/30* (2014.01)
*B23K 26/38* (2014.01)
*B23K 26/08* (2014.01)

(52) U.S. Cl.
CPC .......... *B23K 26/0635* (2013.01); *B23P 25/006* (2013.01); *B23K 26/083* (2013.01); *B23K 26/365* (2013.01); *B23K 26/42* (2013.01); *B23K 26/0853* (2013.01); *B23K 26/0861* (2013.01); *B23K 26/0884* (2013.01); *B23K 26/36* (2013.01); *B23K 26/38* (2013.01)
USPC ............ 219/121.76; 219/121.67; 219/121.68; 219/121.69; 219/121.72

(58) Field of Classification Search
CPC .. B23K 26/00; B23K 26/083; B23K 26/0861; B23K 26/36; B23K 26/365; B23K 26/42; B23P 25/006
USPC .............. 219/121.76, 121.77, 121.68–121.72
See application file for complete search history.

(56) References Cited

U.S. PATENT DOCUMENTS

| 4,925,523 | A  | * | 5/1990  | Braren et al. | .................... 216/66 |
| 6,574,250 | B2 | * | 6/2003  | Sun et al.    | .......................... 372/25 |
| 6,720,519 | B2 | * | 4/2004  | Liu et al.    | .................. 219/121.61 |
| 6,809,291 | B1 | * | 10/2004 | Neil et al.   | ................ 219/121.76 |

(Continued)

FOREIGN PATENT DOCUMENTS

| DE | 198 60 585 A1 | 7/2000 |
| DE | 199 20 813 A1 | 6/2001 |

(Continued)

*Primary Examiner* — Samuel M Heinrich
(74) *Attorney, Agent, or Firm* — R. S. Lombard; K. Bach

(57) ABSTRACT

A laser machining apparatus and method for producing from a workpiece a rotating cutting tool having a cutting edge and a flank. The laser machining apparatus works in two different operating modes. In the first operating mode, a first laser head is used for machining the workpiece at high advance speeds of the workpiece relative to the first laser head to form a rough desired contour with pulses having a duration in the nanosecond range resulting in laser melt cutting. Subsequently, the laser machining apparatus is operated in the second operating mode generating laser pulses with having a pulse duration in the picosecond range. In the second operating mode, a second laser head is activated by means of an optical scanner system and directs the laser pulses onto a two-dimensional pulse area on the surface of the workpiece, the material removal is accomplished by laser ablation.

16 Claims, 4 Drawing Sheets

(56) References Cited

U.S. PATENT DOCUMENTS

| | | | |
|---|---|---|---|
| RE39,001 E | 3/2006 | Lundquist et al. | |
| 7,816,625 B2 * | 10/2010 | Beck et al. | 219/121.71 |
| 2004/0089638 A1 | 5/2004 | Tanaka | |

FOREIGN PATENT DOCUMENTS

| | | |
|---|---|---|
| DE | 100 20 559 A1 | 10/2001 |
| DE | 103 52 402 A1 | 6/2005 |
| DE | 10 2008 022 449 A1 | 11/2009 |
| DE | 20 2008 012 529 U1 | 2/2010 |
| DE | 199 20 813 A1 | 6/2012 |
| JP | 6 126477 A | 5/1994 |
| WO | WO 99/03635 | 1/1999 |
| WO | WO 02/094528 A1 | 11/2002 |
| WO | WO 2006/024585 A1 | 3/2006 |

* cited by examiner

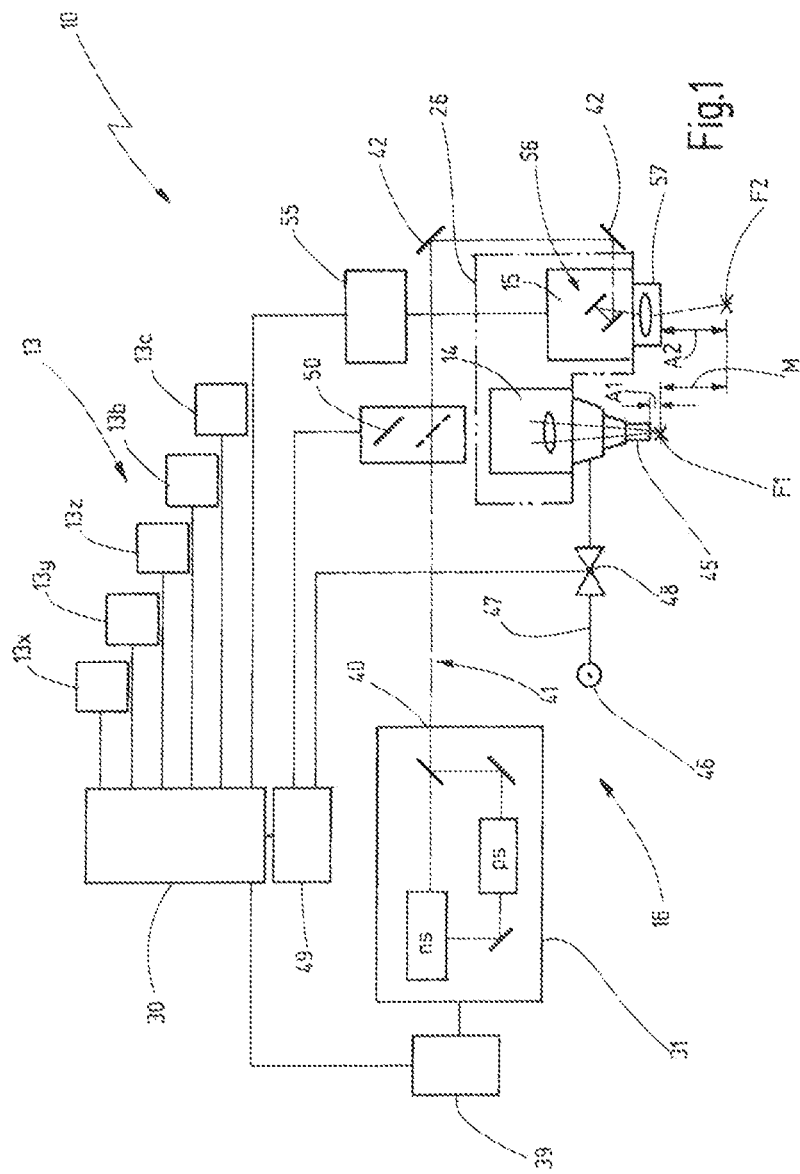

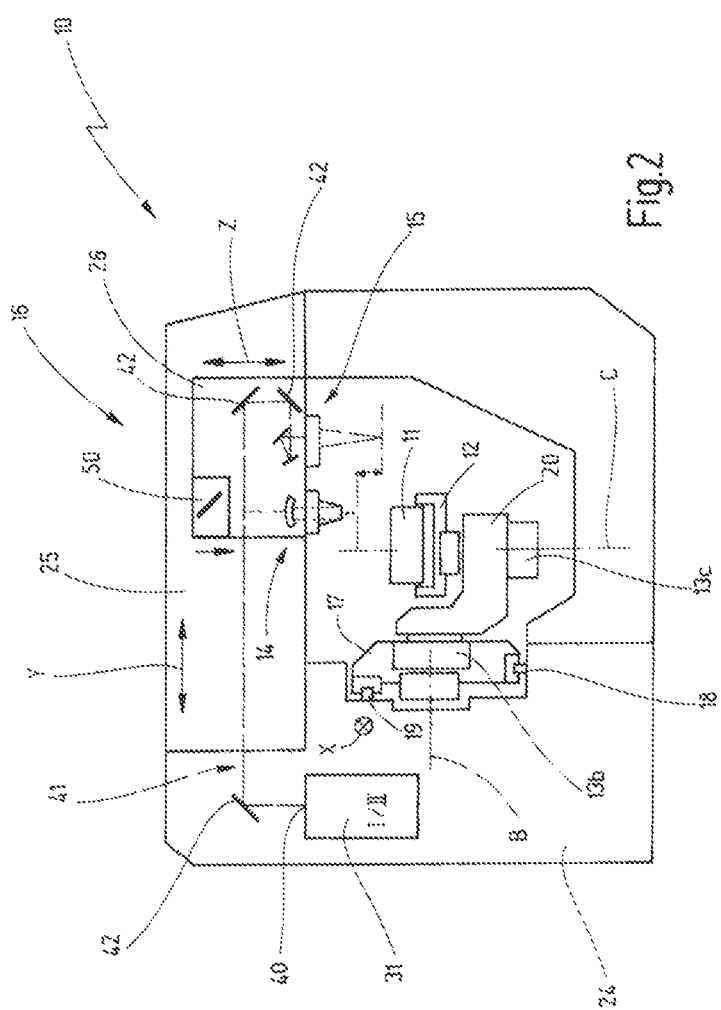

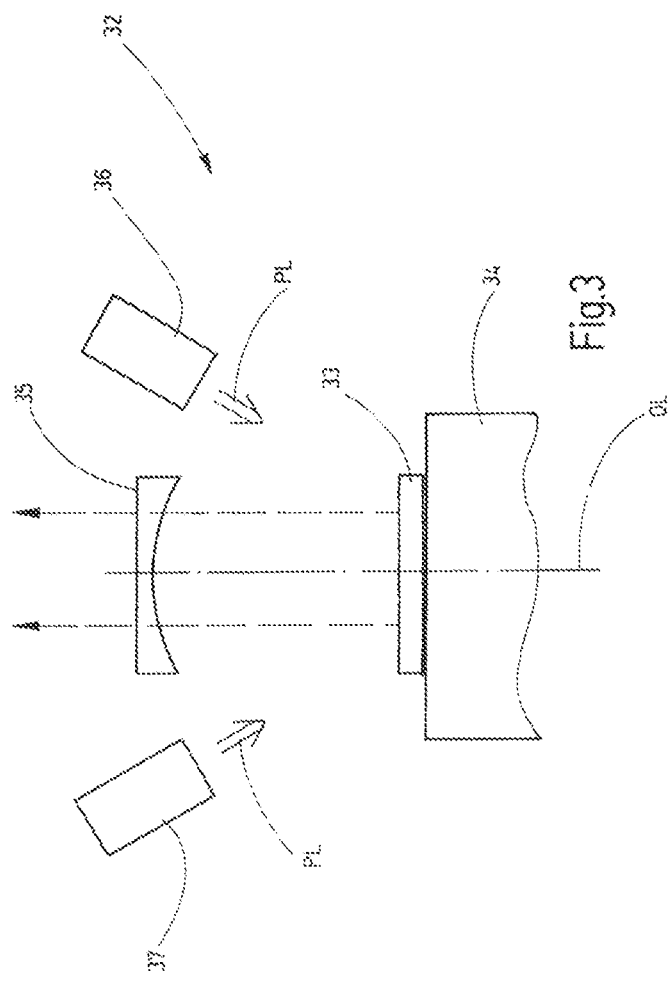

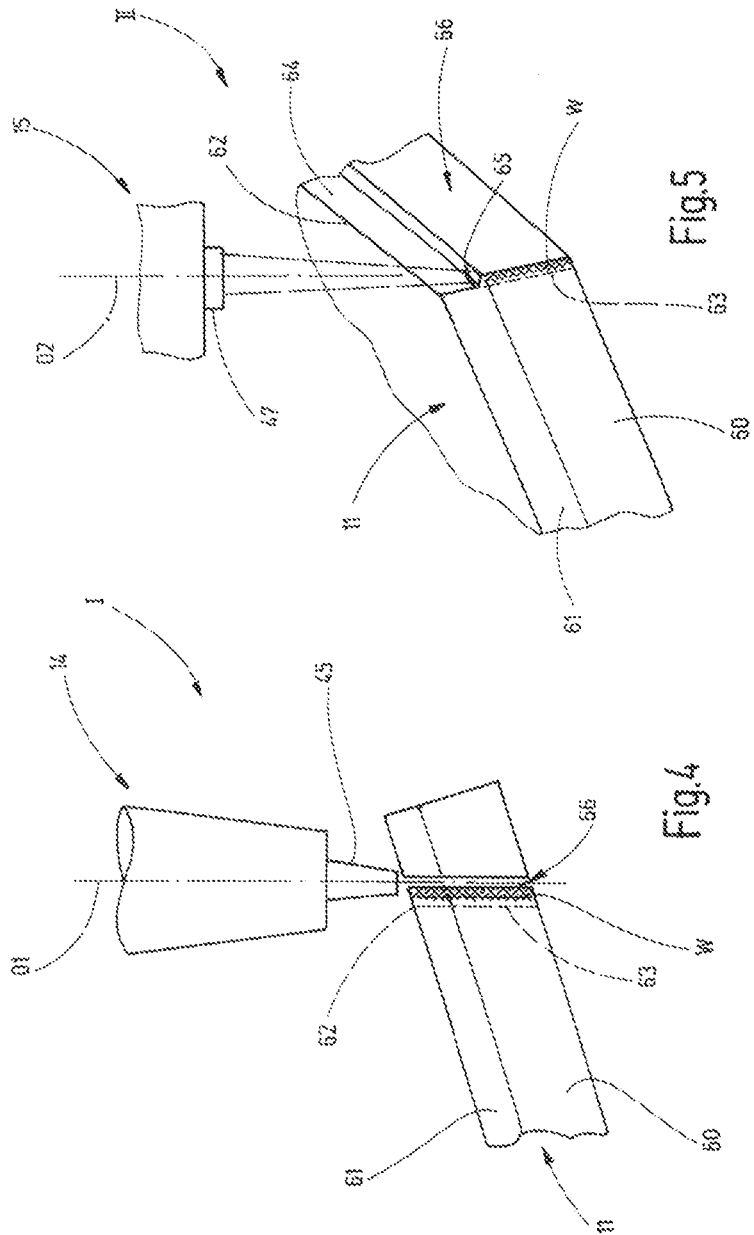

LASER MACHINING APPARATUS WITH SWITCHABLE LASER SYSTEM AND LASER MACHINING METHOD

CROSS-REFERENCE TO RELATED APPLICATION

This application claims the priority of German Application No. 10 2011 000 768.7-34 filed Feb. 16, 2011.

BACKGROUND OF THE INVENTION

The invention relates to a laser machining apparatus for machining a workpiece with a laser, as well as to a laser machining method. The workpiece is a semi-finished product, for example, from which a cutting die or a rotating cutting tool having a cutting edge, a face and a flank is to be produced.

Apparatus and methods for machining workpieces by laser have been known per se. For example, publication DE 100 20 559 A1 describes an apparatus for machining a material by using ultra-short laser pulses. In this case, the laser pulses have a pulse duration of less than 300 picoseconds. Furthermore, the apparatus comprises a testing device that is disposed to apply first laser pulses to the material or the workpiece, then to detect the results of this application, and to obtain information regarding the workpiece therefrom.

Publication U.S. RE 39 001 E describes a method for cutting a ceramic wafer. The laser produces a V-shaped groove in the wafer. To accomplish this, several linear processing passes that are laterally offset relative to each other are performed in order to obtain the V-shape. Subsequently, the wafer can be completely divided at the desired point in the center of the V-shaped groove by one or more process passes on one plane.

Furthermore, publication WO 99/03635 discloses a method, as well as an apparatus, for the manufacture of an embossing die. In this case, the laser beam is either guided to an optical focusing system in order to cut grooves in a workpiece, consisting in particular of wood, in order to accommodate cutting knives or groove knives. Or the laser beam is deflected and directed to a scanner via a foldable mirror that is located in front of the optical focusing system. The workpiece can be engraved via the scanner. For engraving, the laser power can be reduced. The engraving is intended to write on the workpiece that has been provided with grooves in order to simplify the subsequent loading of the workpiece with knives.

The object of the present invention is the highly economical manufacture of a workpiece and, in particular, a cutting die or a rotating cutting tool and, at the same time, ensure the quality of the machined edges and surfaces, in particular the cutting edge of a produced cutting tool. In particular, the apparatus and the method are to be suitable for the manufacture of a cutting tool having a cut surface and a flank from a workpiece.

SUMMARY OF THE INVENTION

The invention provides a laser machining apparatus (10), as well as a method for machining a workpiece (11). A rotating cutting tool having a cutting edge (62) and a flank (64) is manufactured from the workpiece (11). The laser machining apparatus (10) works in two different operating modes. In the first operating mode, a first laser head (14) is used for machining the workpiece (11) at high advance speeds of the workpiece (11) relative to the first laser head (14). In doing so, the workpiece (11) is cut by laser melt cutting so as to display a rough desired contour. In the first operating mode, the duration of the laser pulses is in the nanosecond range. Subsequently, the laser machining apparatus (10) is operated in the second operating mode. In doing so, the laser pulses are generated with a pulse duration in the picosecond range, said laser pulses exhibiting a smaller mean power than those in the first operating mode. In the second operating mode, a second laser head (15) in the form of a scanner head is activated by means of an optical scanner system (56). This optical scanner system directs the laser pulses onto a two-dimensional pulse area (65) on the surface of the workpiece (11). Different from the first operating mode I, the material removal is accomplished by laser ablation in the second operating mode. The thermally influenced zone formed in the first operating mode due to the thermal action of the laser pulses on the workpiece (11) is at least partially removed again by laser ablation during the subsequent machining step, so that a high quality of the machined workpiece (11) is achieved.

The laser machining apparatus in accordance with the invention comprises a holder for holding the workpiece. Furthermore, the apparatus comprises a laser arrangement with a first laser head that is configured, in particular, as a cutting head and a second laser head that, preferably, is implemented as the scanner head. The laser arrangement also comprises a laser source for generating laser pulses. The laser arrangement can be switched between a first operating mode and a second operating mode. In the first operating mode, the first laser head is used and, in the second operating mode, the second laser head is used for reflecting and focusing the laser pulses onto the workpiece. Several infeed axes are disposed to move and/or position the holding means or the workpiece relative to the two laser heads. In this manner, a spatial, as it were three-dimensional, machining of the contour of the workpiece is possible in order to produce the cutting edge and the adjoining flank. The infeed axes may comprise rotary guides and/or linear guides. Preferably, five or six infeed axes are provided.

In accordance with the invention, in the first operating mode, the tool is machined by the thermal action of the laser pulses. Preferably, the workpiece is machined by laser melt cutting. In the first operating mode, the laser pulses are of a greater mean power than in the second operating mode. The mean power in the first operating mode may be, for example, between 50 Watts and 400 Watts, whereas the power in the second operating mode may be between 10 Watts and 100 Watts. In the first operating mode, laser pulses are preferably generated with a pulse duration in the nanosecond range, whereas the laser pulses in the second operating mode have a pulse duration in the picosecond range. Thus, as it were, the workpiece can be rough-cut at very high cutting speeds in the first operating mode. For example, in the first operating mode, it is possible to used laser melt cutting to cut edges of polycrystalline diamond (PCD) having a thickness of one to two millimeters at advance speeds of 20 to 30 meters per minute.

Indeed, high machining speeds are achieved in the first operating mode; however, due to the thermal action of the laser on the workpiece, a thermally affected zone is produced on the workpiece, said zone having a negative effect on the properties of the cutting tool that is to be produced, for example. Therefore, in the second operating mode, the laser arrangement machines the workpiece by laser ablation. The material is converted into a plasma cloud by ultra-short laser pulses, in which case the duration of the action of the laser pulses is so minimal that no thermally affected zone will form. In this case, the duration of action of the laser pulse on the workpiece is not adequate for this. During this second operating mode, preferably at least one part and, in particular, the entire thermally affected zone that has formed in the first operating mode is removed again. The thermally affected zone is removed at least in the regions of the workpiece where high quality is required such as, for example, in the regions of the cutting edge of a cutting tool. In both operating modes, the workpiece is machined at the same point of the outside contour in order to produce the desired three-dimensional form. Due to the two-step method, the workpiece mounted in the holding means can be machined very economically. In this manner, it is possible to thus manufacture cutting tools in a particularly efficient manner. In addition, high-quality workpiece machining is ensured.

Preferably, the laser arrangement comprises a switchable laser source, for example, in the form of a solid state laser and, in particular a disk laser. The laser crystal of the laser having the shape of a rod and, in particular, a disk, can be used in both operating modes for intensifying the light of the respectively used light pump. In the first operating mode, the light pump generates light pulses in the nanosecond range corresponding to the desired pulse duration of the laser pulses. In the same manner, the light pump generates light pulses in the picosecond range in the second operating mode. It is also possible to provide a separate light pump for each operating mode. One or more laser diodes may be used, for example, as the light pump. The laser source may also comprise two resonator arrangements with one or more resonator mirrors, respectively, in which case—depending on the operating mode—the first or the second resonator arrangement is used. Such a laser source may also be implemented free-standing and independent of the remaining features of the invention and be used for other applications.

It is advantageous when the first focus region in which the laser pulses emitted by the first laser head can be focused, does not have spatial intersections with the second focus region in which the laser pulses emitted by the second laser head can be focused. In particular, the first focus region of the first laser head is arranged along its optical axis at a first working distance from the first laser head. The second focus region is located at a second working distance from the second laser head. In a preferred embodiment, the second working distance is greater than the first working distance. This offers the advantage that, while the workpiece is being machined in the second operating mode, spatial moving and/or positioning of the workpiece relative to the second laser head are possible without impairment by the first laser head. As a rule, the finishing pass of the workpiece in the second operating mode requires a more complex alignment and movement of the workpiece relative to the second laser head with the use of the infeed axes than is the case in the first operating mode in the course of rough-cutting. If the second working distance is selected greater than the first working distance, a sufficiently large free space is available for tool movement.

In an exemplary embodiment of the laser machining apparatus, the two laser heads are arranged so as to be immovable relative to each other, whereby their optical axes are preferably arranged parallel to each other.

Preferably, the laser machining apparatus also comprises a movable and, for example, linearly adjustable deflecting means, for example, a deflecting mirror. The deflecting means can be moved into the optical path of the laser pulses or out of the optical path. Depending on the position of the deflecting means, the laser pulses are guided either to the first laser head or to the second laser head. Thus, it is ensured in a very simple manner that only one of the two laser heads is being operated.

Advantageous embodiments of the invention result from the dependent patent claims, as well as from the description.

In the description, the invention is explained with reference to an exemplary embodiment. In doing so, the description is restricted to the essential features of the invention.

BRIEF DESCRIPTION OF THE DRAWINGS

Advantageous features of the invention are apparent from reference to the drawings exemplary of the invention, in which:

FIG. 1 shows a block circuit diagram of an exemplary embodiment of the laser machining apparatus;

FIG. 2 a schematic side view of the laser machining apparatus as in FIG. 1;

FIG. 3 a schematic representation, similar to a block circuit diagram, of a laser source for the laser machining apparatus;

FIG. 4 a schematic representation of the machining of the workpiece in a first operating mode; and FIG. 5 a schematic representation of the machining of the workpiece in the second operating mode.

DETAILED DESCRIPTION OF VARIOUS EMBODIMENTS

FIGS. 1 and 2 show an exemplary embodiment of a laser machining apparatus 10 for machining a workpiece 11 with laser pulses. The laser machining apparatus 10 comprises a holder 12 for holding or mounting the workpiece 11. In accordance with the exemplary embodiment it is possible, via five infeed axes 13, to move and/or position the holding means 12 or the workpiece 11 relative to a first laser head 14 and a second laser head 15 of a laser arrangement 16. The number of infeed axes 13 may also vary as a function of the desired machining of the workpiece 11. Up to six infeed axes 13 may be provided.

In the exemplary embodiment, some of the infeed axes 13 are embodied as a linear guide and some as a circular guide. The first linear guide 13x comprises a carriage 17 that can be moved linearly in X-direction, said carriage—in the exemplary embodiment—being supported from the top on a first rail 18 and being supported on said rail, as well as on a second rail 19 parallel thereto, so to be guided.

A first circular guide 13b is arranged on the carriage 17, where a first limb of an L-shaped holding part 20 is supported on said first circular guide so as to be rotatable about a first rotational axis B. The other limb of the holding part 20 extends approximately parallel to the rotational axis B and extend at a distance therefrom. Arranged on this limb of the holding part 20, there is a second circular guide 13c, on which the holding means 12 is supported so as to be rotatable about a second rotational axis C. The second rotational axis C extends at a right angle with respect to the rotational axis B, i.e., on a vertical plane in the exemplary embodiment.

The two rails 18, 19 are mounted to a machine frame 24. In the exemplary embodiment, a bar 25 is arranged on the machine frame 24 above the carriage 17, said bar forming a second linear guide 13y for moving the laser heads 14, 15 in Y-direction. Arranged on the bar 25 is a carriage 26 that can be moved in Z-direction by means of a third linear guide 13z, said carriage bearing the two laser heads 14, 15. The two laser heads 14, 15 can thus be shifted in linear direction via the second linear guide 13y and the third linear guide 13z in to spatial directions that are at a right angle relative to each other.

The infeed axes 13 are activated by a control device 30 of the laser machining apparatus 10. While the workpiece is being machined, the workpiece 11 is positioned and aligned relative to the first laser head 14 or the second laser head 15, so that the laser pulses impinge at a prespecified angle and at a prespecified location on the workpiece 11.

The laser arrangement 16 comprises a laser source 31 that, in a first operating mode I, generates laser pulses with a pulse duration in the nanosecond range, ns, and, in a second operating mode II of the laser arrangement 16, laser pulses having a pulse duration in the picosecond range, ps. The mean power of the laser pulses is greater in the first operating mode I than in the second operating mode II. In order to generate the laser pulses, the switchable laser source 31 of the preferred exemplary embodiment comprises a disk laser 32 as is schematically illustrated in FIG. 3. The disk laser 32 comprises a laser crystal in the form of a disk 33 that, for example, may have a thickness of a few hundred micrometers. For cooling, the disk 33 is arranged flat on a cooling body 34. The optical axis OL of the disk laser 32 extends at a right angle to the disk 33. Said disk 33 is provided with a reflective coating, not shown, on its reverse side facing the cooling body 34 and, at the same time, acts as a resonator mirror. At a distance from the disk 33, a laser output coupler 35 for bundling the laser light emitted by the disk 33 is provided on the optical axis OL. The laser crystal configured as the disk 33 is excited by the light PL of a light pump 36, 37. In doing so, the light of the light pumps 36, 37 passes several times through the disk 33. In order to ensure this, additional lenses and/or resonator mirrors may be provided, these not being shown in FIG. 3 for the sake of clarity. However, it is possible to provide two resonator arrangements with lenses and/or resonator mirrors, in which case one resonator arrangement is used in the first operating mode I and the other resonator arrangement is used in the second operating mode II. Both resonator arrangements use the disk 33 and a resonator mirror on the reverse side of said disk.

The at least one light pump 36, 37 generates light pulses. In the first operating mode I, the light pulses have a duration in the nanosecond range, whereas those in the second operating mode II have a duration in the picosecond range. For example, a laser diode may be used as the light pump 36, 37. It is also possible to provide a first light pump 36 for the first operating mode I and a second light pump 37 for the second operating mode II. In both operating modes I, II, the same laser crystal is used as the amplifier of the pump light PL. In the exemplary embodiment, this is the disk 33.

A laser source control 39 is provided for switching the laser source 31 from the first operating mode I into the second operating mode II and vice versa, said laser source control being activated by the control device 30. The laser source control 39 sets the setpoint for the pulse duration of the laser pulses and the setpoint for the mean power of the laser pulses.

In both operating modes I, II, the laser pulses are output by the switchable laser source 32 to a laser source outlet 40 and guided along an optical path 41 to the two laser heads 14, 15. To accomplish this, several mirrors 42 or other deflecting devices may be arranged in the optical path 41.

In the exemplary embodiment, the first laser head 14 is configured as a cutting head. The cutting head comprises a cutting nozzle 45, through which a gas from a gas supply 46 can be dispensed via a supply line 47, close to a first focus region F1 of the first laser head 14, onto the workpiece 11 that is to be machined in the first operating mode. A valve 48 is arranged in the supply line for controlling the amount of gas, said valve being activated via a cutting head control 49.

The first focus region F1 represents a point or a distance on the optical axis O1 of the first laser head 14. The focus of the laser pulses of the first laser head 14 may be at an unchangeable distance from the first laser head 14. Alternatively, the focus of the laser pulses can also be adjusted via a lens system of the first laser head 14 inside the first focus region F1 of the optical axis O1 within prespecified limits.

The cutting head control 49 also acts to move a moveable and, in accordance with the example, shiftable, deflecting mirror 50 between a first position and a second position that is shown in dashed lines in FIG. 1. In its second position, the deflecting mirror 50 is located in the optical path 41 and deflects the laser pulses emitted by the laser source 41 into the first laser head 14. If the deflecting mirror 50 is located outside the optical path 41, the laser pulses are deflected along the optical path 41 to the second laser head 15. The cutting head control 49 is activated by the control device 30.

In addition, the control device 30 activates a scanner control 55 that controls the second laser head 15, said laser head being equipped with an optical scanner system 56. The optical scanner system comprises, for example two or three pivotable mirrors, so that the laser pulses emitted by the second laser head 15 via an optical focusing system 57 can be directed in one area to the surface of the workpiece 11. The second laser head 15 that is configured as a scanner head thus directs the laser pulses in a second focus region F2 onto the workpiece surface. The second focus region F2 is an area on the workpiece 11 that may be oriented at a right angle or be inclined relative to the optical axis of the second laser head 15.

The first focus region F1 is at a first working distance A1 from the first laser head 14 and, in accordance with the example, from the free end of the cutting nozzle 45. The point of impingement of the focused laser pulses in the second focus region F2 on the workpiece surface is at a second working distance A2 from the second laser head 15 or from its optical focusing system 57. The second working distance A2 is greater that the first working distance A1 by a minimum value M. The first working distance A1 is a few tenths of a millimeter to a maximum of approximately two or three millimeters. The second working distance A2 is preferably greater than five to twenty centimeters.

The mode of operation and a preferred laser machining method will be described hereinafter with reference to FIGS. 4 and 5.

Initially, the workpiece 11 is mounted by means of the holding means 12. The workpiece 11 is a semi-finished part from which a cutting die and a rotating cutting tool are manufactured. The workpiece 11 comprises a base body 60 of hard metal provided with a cutting layer 61. In the exemplary embodiment, the cutting layer 61 consists of polycrystalline diamond. In the completely machined workpiece 11, the cutting edge 62 is provided on this cutting layer 61.

Corresponding to the free angles to be produced, the workpiece 11 is aligned so as to be inclined relative to the optical axis O1 of the first laser head 14. The switchable laser source 31 is adjusted so as to generate laser pulses in the nanosecond range. In doing so, the mean power of the laser pulses is between 40 Watts and 400 Watts. The deflecting mirror 50 is moved into the optical path 41, so that the laser pulses generated by the laser source 31 are deflected to the first laser head 14. The laser machining apparatus 10 operates in the first operating mode I, as schematically shown in FIG. 4. In doing so, the workpiece 11 is machined by laser melt cutting due to the thermal action of the laser beam pulses. While the workpiece 11 is being cut, said workpiece can be advanced at a high speed of 20 to 30 meters per minute in the first operating mode I. In this manner, the rough contours of the workpiece can be produced. Due to the high advance speed, machining is very fast in the first operating mode I. In the first operating mode I, a rough machining operation is performed, as it were.

However, in doing so, a thermally influenced zone W is formed adjacent to the cut surface, as is schematically illustrated by a cross-hatched area in FIG. 4. The cut surface 66 produced by laser melt cutting is thus located at a distance relative to the final desired contour 63 in the first operating mode I, said distance being greater than the depth of the thermally influenced zone W extending from the cut surface 66 into the workpiece 11. Representing the desired contour 63, the free area in FIG. 4 is shown in dashed lines.

Subsequently, the laser arrangement 16 of the laser machining apparatus 10 is switched into the second operating mode II. In this second operating mode II, the second laser head 15 is used. Consequently, the deflecting mirror 50 is moved out of the optical path 41. The switchable laser source 31 is reversed and delivers laser pulses with a shorter pulse duration than in the first operating mode I, said pulse duration being in the picosecond range, for example. These laser pulses are fed into the optical path 41 by the laser source output 40 and deflected to the second laser head 15 by the deflecting mirror 42. There, the laser pulses are directed onto the workpiece surface via the optical scanner system 56 and the optical focusing system 57, as is shown by FIG. 5. The mean power of the laser pulses is smaller than in the first operating mode I and is 10 Watts to a maximum of 100 Watts, for example.

In this second operating mode II, the material is not separated from the workpiece 11 by thermal action but is converted into plasma by laser ablation. This rapid heating of the workpiece at the point of impingement of the laser pulses and the resultant plasma formation has the effect that the thermal energy cannot spread in the workpiece 11. Therefore, in the second operating mode II, no thermally influenced zone will form on the workpiece 11. A thermally influenced zone W has disadvantages in view of the quality of the tool to be manufactured, in particular, when a cutting tool having a cutting edge 62 is produced from the workpiece 11. The thermally influenced zone W that formed in the first operating mode I is completely removed in the course of machining the workpiece in the second operating mode II, as is the case in the exemplary embodiment. However, at least the thermally influenced zone W in the region of the cutting edge 62 must be removed in order to achieve an adequate shelf-life of the produced cutting tool.

The material ablation is performed in the second operating mode II by the second laser head 15 in such a manner that the laser pulses are directed in a prespecified sequence onto a two-dimensional pulse area 65. To accomplish this, the pulse area 65 is oriented so as to be inclined relative to the optical axis O2 of the second laser head 15. While the laser pulses are directed through the scanner lens system 56 of the second laser head 15 inside the pulse area 65 at a plurality of points of impingement, one or more of the infeed axes 13 perform, at the same time, a relative movement of the workpiece 11 with respect to the second laser head 15. This relative movement is slower by orders of magnitude than the speed at which the laser pulses are moved through the optical scanner system 56 along the points of impingement within the pulse area 65. Consequently, a material ablation is achieved in the region of the pulse area 65, said material ablation slowly progressing along the workpiece 11 due to the relative movement via the infeed axes 13. In this second operating mode II, the final desired contour 63 on the workpiece 11 is produced by laser ablation with the use of the second laser head 15. Referring to the exemplary embodiment, the cutting edge 62 and the adjoining flank 64 are formed as a result of this. During this second machining step in the second operating mode II, the thermally influenced zone W is completely removed.

The invention relates to a laser machining apparatus 10, as well as to a method for machining a workpiece 11. A rotating cutting tool having a cutting edge 62 and a flank 64 is manufactured from the workpiece (11). The laser machining apparatus 10 works in two different operating modes I, II. In the first operating mode I, a first laser head 14 is used for machining the workpiece 11 at high advance speeds of the workpiece 11 relative to the first laser head 14. In doing so, the workpiece 11 is cut by laser melt cutting so as to display a rough desired contour. In the first operating mode I, the duration of the laser pulses is in the nanosecond range. Subsequently, the laser machining apparatus 10 is operated in the second operating mode II. In doing so, the laser pulses are generated with a pulse duration in the picosecond range, said laser pulses exhibiting a smaller mean power than those in the first operating mode I. In the second operating mode II, a second laser head 15 in the form of a scanner head is activated by means of an optical scanner system 56. This optical scanner system directs the laser pulses onto a two-dimensional pulse area 65 on the surface of the workpiece 11. Different from the first operating mode I, the material removal is accomplished by laser ablation in the second operating mode II. The thermally influenced zone W formed in the first operating mode I due to the thermal action of the laser pulses on the workpiece 11 is at least partially removed again by laser ablation during the subsequent machining step, so that a high quality of the machined workpiece 11 is achieved.

LIST OF REFERENCE SIGNS

10 Laser machining apparatus
11 Workpiece
12 Holder or holding means
13 Infeed axis
13x First linear guide
13y Second linear guide
13z Third linear guide
13b First circular guide
13c Second circular guide
14 First laser head
15 Second laser head
16 Laser arrangement
17 Carriage
18 First rail
19 Second rail
20 Holding part
24 Machine frame
25 Bar
26 Carriage
30 Control device
31 Laser source
32 Disk laser
33 Disk
34 Cooling body
35 Output coupler
39 Laser source control
40 Laser source outlet
41 Optical path
42 Mirror
45 Cutting nozzle
46 Gas supply
47 Supply line
48 Valve
49 Cutting head control
50 Deflecting mirror
55 Scanner control
56 Optical scanner system 57 Optical focusing system
60 Base body
61 Cutting layer
62 Cutting edge
63 Desired contour
64 Flank
65 Pulse area
66 Cut surface
A1 First working distance
A2 Second working distance
B First rotational axis
C Second rotational axis
F1 First focus point
F2 Second focus region
M Minimum value
OL Optical axis of the disk laser
O1 Optical axis of the first laser head
O2 Optical axis of the second laser head
W Thermally influenced zone

What is claimed is:

1. Laser machining apparatus (10) comprising a holder (12) for holding a workpiece (11), a laser arrangement (16) for switching between a first operating mode (I) and a second operating mode (II), said laser arrangement comprising a first laser head (14) for use in the first operating mode (I) and a second laser head (15) for use in the second operating mode (II), the laser arrangement (16) for machining the workpiece (11) by thermal action in the first operating mode (I) wherein a thermally influenced zone (W) is produced on the workpiece (11) and for machining the workpiece (11) by laser ablation in the second operating mode (II) wherein at least partly or entirely the thermally influenced zone (W) on the workpiece (11) produced during the first operating mode (I) is removed, and the laser arrangement (16) comprising several infeed axes (13) for moving and/or positioning the holder (12) relative to the first and the second laser heads (14, 15).

2. Laser machining apparatus as in claim 1, characterized by the laser arrangement (16) comprises a laser source (31) for generating laser pulses in the nanosecond range via the first laser head (14) in the first operating mode (I) and for generating laser pulses in the picosecond range via the second laser head (15) in the second operating mode (II).

3. Laser machining apparatus as in claim 2, characterized by the laser source (31) comprises a solid state laser and, in particular, a disk laser (32).

4. Laser machining apparatus as in claim 3, characterized by the disk laser (32) having a disk (33), the disk laser (32) further comprising at least one light pump (36, 37), the disk (33) for intensifying the light of the at least one light pump (36, 37) in both the first operating mode (I) and the second operating mode (II).

5. Laser machining apparatus as in claim 1, characterized by the first laser head (14) is configured as a cutting head for laser melt cutting.

6. Laser machining apparatus as in claim 1, characterized by the second laser head (15) is configured as a scanner head comprising an optical scanner system (56).

7. Laser machining apparatus as in claim 2, characterized by a first focus region (F1) in which the laser pulses emitted by the first laser head (14) can be focused is arranged without overlap relative to a second focus region (F2) in which the laser pulses emitted by the second laser head (15) can be focused.

8. Laser machining apparatus as in claim 7, characterized by the second focus region (F2), in which the laser pulses emitted by the second laser head (15) can be focused, is at a greater working distance (A2) from the first laser head (14) and/or from the second laser head (15) than is the first focus region (F1), in which the laser pulses emitted by the first laser head (14) can be focused.

9. Laser machining apparatus as in claim 2, characterized by the laser arrangement (16) comprises a movable optical deflecting means (50) for movement into and out of the optical path (41) of the laser pulses for deflecting the laser pulses either to the first laser head (14) or to the second laser head (15).

10. Laser machining apparatus as in claim 2, further comprising a laser source control (39) for setting the pulse duration of the laser source (31) and for setting setpoints for the mean power of the laser pulses of the laser source (31).

11. Laser machining apparatus as in claim 10, characterized by the laser source control (39) is for setting the setpoint for the mean power of laser pulses in the first operating mode (I) greater than the setpoint for the mean power of laser pulses in the second operating mode (II).

12. Method for machining a workpiece (11), using a laser machining apparatus (10) comprising a holder (12) for holding a workpiece (11), a laser arrangement (16) for switching between a first operating mode (I) and a second operating mode (II), said laser arrangement comprising a first laser head (14) for use in the first operating mode (I) wherein a thermally influenced zone (W) is produced on the workpiece (11) and a second laser head (15) for use in the second operating mode (II), and the laser arrangement (16) comprising several infeed axes (13) for moving and/or positioning the holder (12) relative to the first and the second laser heads (14, 15), said method comprising the following steps:

Positioning and/or moving the workpiece (11) relative to the first laser head (14), Operating the switchable laser arrangement (16) in the first operating mode (I) with the first laser head (14), and machining the workpiece (11) by thermal action wherein the thermally influenced zone (W) is produced on the workpiece (11), Positioning and/or moving the workpiece (11) relative to the second laser head (15), Operating the switchable laser arrangement (16) in the second operating mode (II) with the second laser head (15) and machining the workpiece (11) by laser ablation wherein at least partly or entirely the thermally influenced zone (W) on the workpiece (11) produced during the first operating mode (I) is removed.

13. Method as in claim 12, further comprising the step of, in the first operating mode (I) of the laser arrangement (16), generating laser pulses in the nanosecond range, and machining the workpiece (11) by laser melt cutting.

14. Method as in claim 13, further comprising the step of, in the second operating mode (II) of the laser arrangement (16), generating laser pulses in the picosecond range, and machining the workpiece (11) by laser ablation.

15. Method as in claim 14, further comprising the step of, in the second operating mode (II), fine machining or finishing the workpiece (11) for producing a cutting edge (62), and/or for producing a chip guide step and/or for producing a structuring of the surfaces of the workpiece (11).

16. Method as in claim 14, further comprising the step of applying the mean power of the laser pulses in the first operating mode (I) greater than the mean power of the laser pulses applied in the second operating mode (II).

* * * * *